United States Patent Office 2,717,913
Patented Sept. 13, 1955

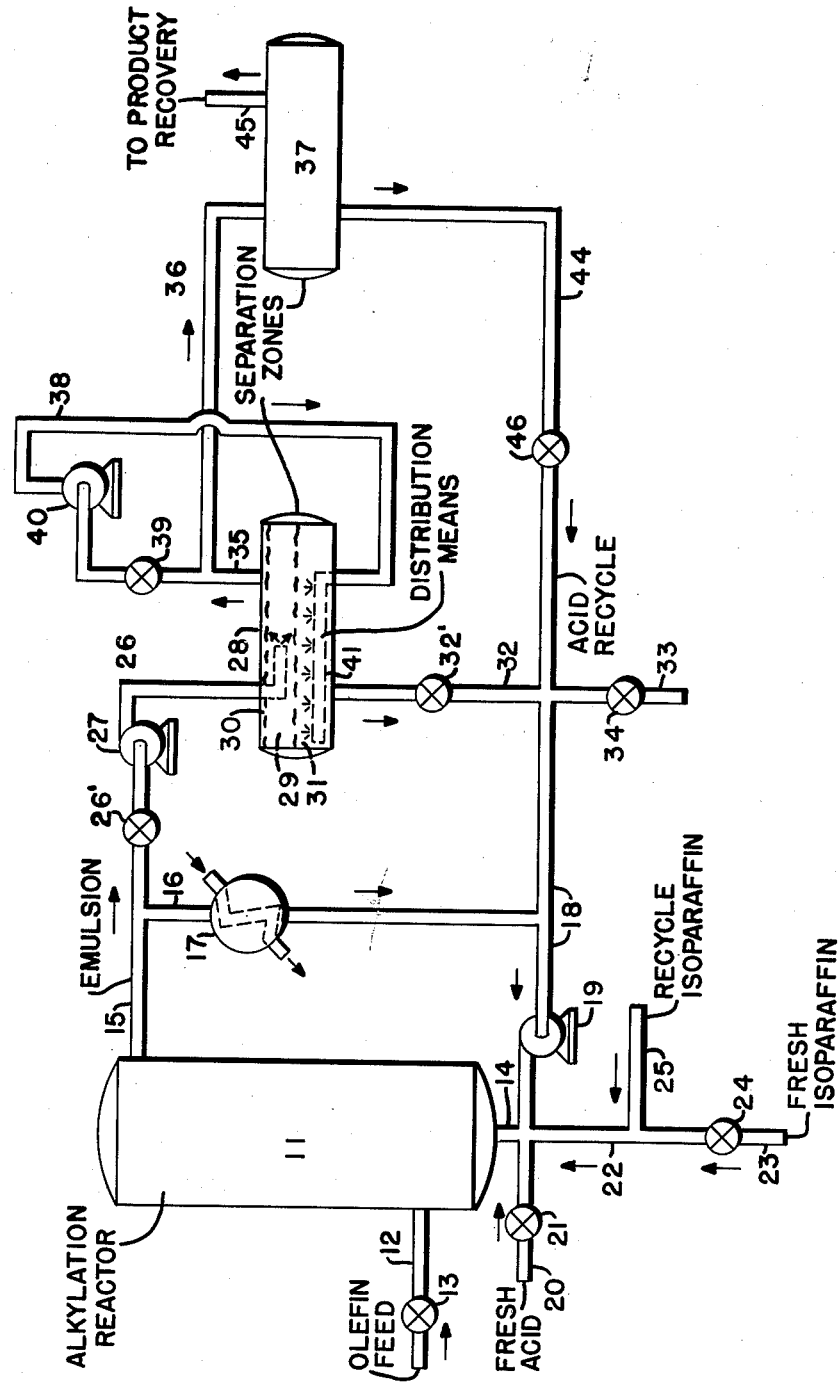

2,717,913

SEPARATION METHOD FOR OLEFIN ALKYLATION

Walter F. Rollman, Cranford, N. J., assignor to Esso Research and Engineering Company, a corporation of Delaware Application August 28, 1952, Serial No. 306,805

3 Claims. (Cl. 260—683.4)

The present invention relates to a method for alkylating various organic materials with olefinic hydrocarbons in the presence of a liquid catalyst to produce alkylated organic compounds such as branched chain paraffinic hydrocarbons. More particularly, the invention relates to an improved method for separating product and liquid acid in an alkylation process of this character.

Characteristically, the olefinic materials contemplated by the present invention, and capable of entering into an alkylation reaction with compounds such as isoparaffinic hydrocarbons, may also be polymerized or degraded into sludge by contact with the catalyst materials employed for alkylation. In order to avoid the polymerization and sludge forming reactions, or at least to reduce them to a minimum when alkylation is desired, various process expedients have been employed. A conventional procedure to inhibit concurrent polymerization, as well as to prevent other undesirable secondary or side reactions, has been to effect catalytic alkylation reactions under conditions designed to avoid intimate contact of the olefins with the catalyst material in the comparative absence of isoparaffins. To accomplish this, it has been customary to provide a substantial excess of isoparaffins in the reaction zone or to dilute the olefin material with a material containing a substantially greater amount of isoparaffins prior to introduction into the reaction zone. For example, the olefins may be diluted or mixed with a portion of the emulsion derived from the reaction zone itself and recycled therefrom, or the olefin material may be introduced in successive increments in a continuous series of reaction zones or stages containing previously emulsified and contacted materials.

The above expedients, however, do not eliminate completely the polymerization of olefins in an emulsion alkylation process. Conventionally, the emulsion withdrawn from the reaction zone for product recovery is separated into its hydrocarbon and liquid acid components. The hydrocarbon is sent to a product recovery system, and the acid is returned to the reaction zone. Complete separation is not obtained since substantial olefins remain dissolved in the separated acid; however, substantially no paraffinic hydrocarbons remain in the settled acid. The separated hydrocarbon phase consists chiefly of unreacted isoparaffins and alkylate product. Since the emulsion separation step requires an appreciable period of time, it follows that the olefins dissolved in the acid phase, in the comparative absence of isoparaffins, will undergo the competing polymerization and sludge forming reactions in both the separation zone and the lines recycling the acid phase to the reaction zone. Consequently, polymers comparatively low in octane number find their way into the alkylate product reducing the quality thereof. The sludge remains in the acid, and acid consumption is increased.

It is an object of the present invention to provide a system for carrying out catalytic reactions of the general character contemplated, and especially to provide an improved method for separating the emulsion from the alkylation process by means of which polymerization and other side reactions are reduced to a minimum with a resulting improvement in the yields and quality of the desired products. It is a further object of the invention to accomplish these improvements by relatively simple expedient that entails a minimum investment in new equipment and equipment changes and that avoids changes in material balances and product recovery capacity in existing alkylation units. These and other objects of the present invention will become apparent from the following description taken in connection with the sole drawing that illustrates a simplified flow plan of an alkylation system incorporating a preferred embodiment of the improved separation process.

In accordance with the present invention, the portion of the acid-hydrocarbon emulsion withdrawn from the alkylation reaction zone for product recovery is continuously charged to a separation zone. The resolution of the emulsion in the separation zone creates a top hydrocarbon layer including alkylate reaction products and unreacted isoparaffins and a bottom acid layer containing dissolved olefins. A portion of the withdrawn hydrocarbon layer is continuously dispersed in the acid layer. The remaining withdrawn hydrocarbon is set to product recovery operations. Acid is continuously withdrawn from the acid layer and returned to the reaction zone.

The continued introduction of a portion of the hydrocarbon product stream into the acid layer insures the presence of excess isoparaffins in the acid layer at all times. This promotes alkylation of the dissolved olefins and minimizes olefin polymerization and other degradation reactions. The introduction of hydrocarbon as a spray into the settled acid causes some turbulence in the intermediate emulsion phase. This turbulence promotes emulsion resolution and decreases retention time in the reaction zone. By injecting separated hydrocarbon rather than an extraneous isoparaffin stream into the acid phase, the material balance in the entire system is not upset, and the net load on product recovery equipment is not increased.

Referring to the drawing in detail, the numeral 11 designates a reaction vessel. This vessel may be of any suitable proportions as required by the volume of process materials to be handled and by the residence time required for the reaction to be carried out therein. For example, in a typical alkylation reaction, vessel 11 should be of such volume as to permit a residence time of the materials in the reactor vessel of from about 1 minute to about 5 minutes.

Zone 11 is provided with means for introducing liquid catalyst, olefin and isoparaffin into an emulsion pool including these components that is maintained within the zone. In the apparatus as shown, olefin feed is introduced through pipe or line 12 including control valve 13, and a stream of acid and isoparaffin are introduced by line 14. An emulsion phase is maintained in zone 11 by any suitable agitating or contacting means such as by recirculating the emulsion at high turbulence, or by other means known to the art.

A portion of the emulsion, continuously withdrawn from the upper portion of zone 11 through line 15, is passed through branch line 16 containing cooling means 17, for removal of heat of reaction, to maintain the desired reaction temperature level, and is recycled back to the zone via line 18 containing pump 19 and line 14. Fresh acid catalyst is added to the system as needed through line 20 including control valve 21, this acid conveniently being added to the recycled emulsion. Isoparaffin feed may also be added to the recycled emulsion by means of line 22 before being charged to the reaction zone. The isoparaffin includes a fresh stream charged to the system as needed through line 23 containing valve 24, and a recycle stream, derived from the product recovery system not shown, that passes through line 25.

A portion of the emulsion removed from reaction zone 11 by line 15 is withdrawn from the reaction system, for product recovery, by line 26 containing control valve 26' and pump 27, and is introduced into primary separation zone 28. Zone 28 may be any conventional type of separator or settling vessel providing for the separation of an emulsion of immiscible materials into its respective lighter and heavier components. The emulsion layer 29 is intermediate the lighter hydrocarbon phase 30 including alkylate and unreacted isoparaffins and the heavier acid phase 31 containing dissolved olefins. Acid phase is continuously withdrawn from zone 28 through line 32, containing control valve 32' and communicating with line 18, for recycling to reaction zone 11. Spent acid may be withdrawn from the system when necessary by line 33 including valve 34.

Hydrocarbon phase is continuously withdrawn from zone 28 by means of line 35, and a portion thereof is charged through branch line 36 to a secondary separation zone 37. The remainder of the withdrawn hydrocarbon layer is passed through branch line 38 which contains control valve 39 and pump 40. Line 38 is fluidly connected to distribution means 41 positioned within separation zone 28 in the lower portion of acid phase 31. Distribution means 41 may be any suitable device for injecting the recycled hydrocarbon phase as a spray throughout substantially the entire acid phase. A conventional pipe spider may be used, for example. Other arrangements may include injecting the hydrocarbon through porous thimbles and the like. The spray of injected hydrocarbons should be such that isoparaffin is maintained in intimate contact with the acid and dissolved olefin whereby alkylation of the olefins is promoted and olefin degradation reactions are retarded. The hydrocarbons injected into the acid will, for the most part, pass upwardly through the acid and emulsion phases, recombine with the hydrocarbons in phase 30, and be withdrawn through line 35. Some of the injected hydrocarbons will be entrained in acid recycled to the reaction zone 11.

The hydrocarbon streams introduced through distribution means 41 may have sufficient velocity to create mild turbulence in emulsion phase 29 thereby promoting resolution of the emulsion. The injected hydrocarbon should not, however, disturb the resolution of the emulsion or agitate the contents of the settling zone sufficiently to cause remulsification of the separated components. By controlling the velocity and dispersion of the hydrocarbons, demulsification may be aided whereby total retention time of the components in the separation zone is decreased and separation zone capacity is increased. This in some measure compensates for the additional settling zone volume required for hydrocarbons recycled to the acid phase.

The portion of the hydrocarbon phase charged to secondary settling zone 37 is subjected to a final settling step to remove any acid entrained therein. Settled acid may be withdrawn through line 44 containing valve 46 and recycled to the reaction zone 11 through lines 18 and 14. Hydrocarbon is withdrawn through line 45 and passed to a conventional product recovery system not shown. This recovery system may include a neutralization zone for neutralizing and removing any acidic constituents from the hydrocarbon, and a fractionation zone for separating the hydrocarbon into alkylate product and a stream concentrated in isoparaffin. The recovered isoparaffin stream may be recycled to the reaction system through line 25 as heretofore described.

If desired, zone 37 may be provided with means for recycling some separated hydrocarbon back to the acid phase as described in connection with the system for zone 28. This operation would be desirable only when the amount of acid carried into zone 37 is sufficient to create olefin degradation difficulties. Obviously, separation zone 28 may consist of one large vessel or of a plurality of vessels operating in series or in parallel.

The system as illustrated is suitable for employment under any circumstances in which two or more substantially immiscible materials of different specific gravities are to be contacted, and is particularly useful under circumstances in which such contact is made for the purpose of initiating a chemical reaction involving the materials, in which the reactants and the reaction products may be separated from the catalyst material employed by gravity; and in which a more reactive component such as olefins dissolves to some extent in the separated catalyst material. More specifically, the system is adapted for employment in the alkylation of isoparaffins with an olefin, in the presence of a liquid active acid catalyst material such as concentrated sulfuric acid. For example, the system is suitable for the alkylation of butylenes with isobutane in the presence of sulfuric acid having a strength of from about 90 to about 98%, in which the alkylation reaction is carried out at a temperature of from about 30° to about 60° F. In such a reaction, it is desirable that the isobutane be present in the reactant materials in an amount considerably in excess of the butylene in order to insure substantially complete utilization of the latter material. It is also desirable that the operation provide against uncontrolled polymerization of the butylene component.

In a typical operation, isoparaffins and olefins may be introduced into the system in such proportions as to result in a total feed in which the several components are present substantially as follows:

| Component: | Per cent total feed |
| --- | --- |
| $C_3$ | 3 |
| Butylene | 15 |
| Isobutane | 70 |
| Normal butane | 12 |

Normally, the olefin material initially fed into the system through line 12 may be supplied by a composition substantially as follows:

| Component: | Per cent total feed |
| --- | --- |
| $C_3$ | 1 |
| Butylene | 40 |
| Isobutane | 47 |
| Normal butane | 12 |

In order to achieve the desired proportions of butylenes to isobutane in the reaction mixture, additional butane will be made available from some other source. The material passing through line 23 may have a composition substantially as follows:

| Component: | Per cent total feed |
| --- | --- |
| $C_3$ | 3 |
| Isobutane | 85 |
| Normal butane | 12 |

A suitable feed material also may be obtained by recycling unreacted isobutane through line 25, this recycled stream being recovered from the product stream as heretofore described.

In an operation in which about 5000 barrels per day (B/D) of alkylate product are produced, about 30,000 B/D of sulfuric acid is handled by reaction zone 11. The total isobutane handled is about 70,000 B/D, and about 3000 B/D of fresh isobutane will be needed. About 7000 B/D of butylene feed will be used. About 20,000 B/D of emulsion including about 4000 B/D of acid will be withdrawn through line 26 from the reaction system and passed to settling zone 28. The acid settling in zone 28 contains about 400 B/D of dissolved olefins. The separated hydrocarbon withdrawn through line 35 represents about 16,500 B/D, of which approximately 50% is isobutane. Approximately 2000 B/D of the separated hydrocarbon is recycled through distribution means 41 into the settled acid layer, thus maintaining a molar excess of isoparaffin over olefin in the settled acid. Whereas, under conventional conditions, the alkylate product will contain several hundred B/D of low octane polymer and the like, the above modification effects a substantial reduction in the amount of low octane materials formed. Thus, alkylate octane number may be increased by several tenths of a point and acid consumption decreased by a substantial amount. Furthermore, this mode of operation does not change the inventory of hydrocarbons in the system. If extraneous isobutane were charged to the acid layer in zone 28, product fractionation capacity would have to be increased by as much as 1000 B/D to achieve the same results. The mode of the present invention thus provides improved product quality, increased life of catalyst and economies in processing to achieve the desired results.

While the above specific example illustrates a typical alkylation operation, it is not desired to be bound by the specific reaction conditions and proportions of reactants set forth. As will be obvious to one skilled in the art, various ratios of catalyst to reactants and various ratios of reactant components may be used to obtain suitable products.

The amount of separated hydrocarbon to be recycled to the settled acid phase may be varied over a rather wide range depending on such factors as the olefin content of the settled acid, the degree of intimacy of contact obtained in the acid phase and the like. Generally, it is desired to recycle sufficient hydrocarbon to supply at least a molar excess of isoparaffin over the olefin dissolved in the acid when good contact between dispersed hydrocarbon and acid is obtained. The ratio of dispersed isoparaffin to dissolved olefin may be as high as 5:1 or higher if necessary. The ratios will be limited to some extent by the capacity of the settling zone, and it is not desired to employ a ratio sufficiently high to increase unduly settling zone capacity. With proper recycle hydrocarbon contacting and dispersing means, existing settling zones may be adapted to the present process, since the amount of recycled hydrocarbon is relatively low in comparison to total throughput through the settling zone.

Although the example specifically discloses alkylation of isobutane with butylene in the presence of sulfuric acid as catalyst, the present invention contemplates similar operations employing other suitable paraffinic and olefinic materials, including isopentane, propylene and amylenes. Other suitable liquid catalysts include hydrofluoric acid, mixtures of sulfuric and phosphoric acids, as well as certain complexes of aluminum chloride and boron fluoride.

What is claimed is:

1. In the process of reacting isoparaffinic hydrocarbons with olefinic hydrocarbons in the presence of an acid catalyst to form branched chain saturated hydrocarbons, which comprises contacting an emulsified body of said reactant materials and catalyst in a confined reaction zone under reaction conditions, continuously withdrawing a portion of the emulsified body from said zone, charging said withdrawn emulsion to a settling zone wherein it is separated into a catalyst layer containing dissolved olefins and a hydrocarbon layer including reaction product and unreacted isoparaffins, returning said separated catalyst layer to said reaction zone and withdrawing said hydrocarbon layer, the improvement which comprises continuously dispersing a portion of said withdrawn hydrocarbon layer through said catalyst layer within said settling zone whereby undesirable reactions of said dissolved olefins are minimized.

2. A process as in claim 1 wherein the amount of said hydrocarbon layer dispersed in said catalyst layer is sufficient to provide at least a molar excess of said unreacted isoparaffins over said dissolved olefins.

3. A process as in claim 2 wherein said acid catalyst is sulfuric acid.

References Cited in the file of this patent

UNITED STATES PATENTS

| | | |
|---|---|---|
| 2,313,660 | Montgomery | Mar. 9, 1943 |
| 2,389,604 | Dowding | Nov. 27, 1945 |
| 2,428,506 | Van Der Valk | Oct. 7, 1947 |
| 2,454,869 | Goldsby et al. | Nov. 30, 1948 |